United States Patent
Dierks et al.

(10) Patent No.: US 9,476,530 B2
(45) Date of Patent: Oct. 25, 2016

(54) CONNECTING DEVICE

(71) Applicant: BUERKERT WERKE GMBH, Ingelfingen (DE)

(72) Inventors: Johannes Dierks, Oehringen (DE); Florian Fischer, Ravenstein (DE)

(73) Assignee: BUERKERT WERKE GMBH (DE)

( * ) Notice: Subject to any disclaimer, the term of this patent is extended or adjusted under 35 U.S.C. 154(b) by 221 days.

(21) Appl. No.: 14/258,939

(22) Filed: Apr. 22, 2014

(65) Prior Publication Data

US 2014/0312609 A1 Oct. 23, 2014

(30) Foreign Application Priority Data

Apr. 22, 2013 (DE) .................. 20 2013 101 718 U

(51) Int. Cl.
| | |
|---|---|
| *G01F 5/00* | (2006.01) |
| *F16L 37/107* | (2006.01) |
| *F16L 41/00* | (2006.01) |
| *G01F 15/18* | (2006.01) |

(52) U.S. Cl.
CPC ............ *F16L 37/107* (2013.01); *F16L 41/008* (2013.01); *G01F 15/185* (2013.01)

(58) Field of Classification Search
CPC .... A61M 39/26; F16L 37/113; F16L 37/107; Y10T 137/87338
USPC ........ 137/384.2, 384.4, 385, 599.01, 599.11, 137/599.13, 884; 251/149.2; 285/33
See application file for complete search history.

(56) References Cited

U.S. PATENT DOCUMENTS

| | | | | |
|---|---|---|---|---|
| 3,710,823 | A * | 1/1973 | Vik ................... | F16K 31/52425 137/594 |
| 5,080,131 | A * | 1/1992 | Ono ..................... | G01F 1/6842 137/486 |
| 6,095,572 | A * | 8/2000 | Ford .................... | F16L 37/107 210/198.2 |
| 7,988,488 | B2 * | 8/2011 | Orlando .............. | H01R 13/622 439/551 |
| 8,215,971 | B2 | 7/2012 | Bayerbach et al. .......... 439/158 |
| 2002/0038671 | A1 * | 4/2002 | Johnson ............... | F16K 27/003 137/884 |
| 2002/0038672 | A1 * | 4/2002 | Tsourides ............. | F16K 27/003 137/884 |
| 2003/0085572 | A1 * | 5/2003 | Froment .............. | F16L 37/084 285/361 |

FOREIGN PATENT DOCUMENTS

| | | | |
|---|---|---|---|
| DE | 202009003650 | 6/2009 | ............. F16L 29/04 |
| WO | WO2010125442 | 11/2010 | ............. F16L 37/36 |

OTHER PUBLICATIONS

German Search Report issued in corresponding application No. DE 20 2013 101 718.3, dated Jan. 16, 2014 (5 pgs).

* cited by examiner

*Primary Examiner* — John Fox
*Assistant Examiner* — Reinaldo Sanchez-Medina
(74) *Attorney, Agent, or Firm* — Hayes Soloway P.C.

(57) ABSTRACT

A connecting device for connecting a fluid sensor to a channel module has a locking device that can secure the fluid sensor on the channel module, a closure device that can allow the flow of a fluid conducted in the channel module from the channel module to the fluid sensor, and an actuating means, the actuating means actuating the locking device.

23 Claims, 4 Drawing Sheets

CONNECTING DEVICE

Figure 2:
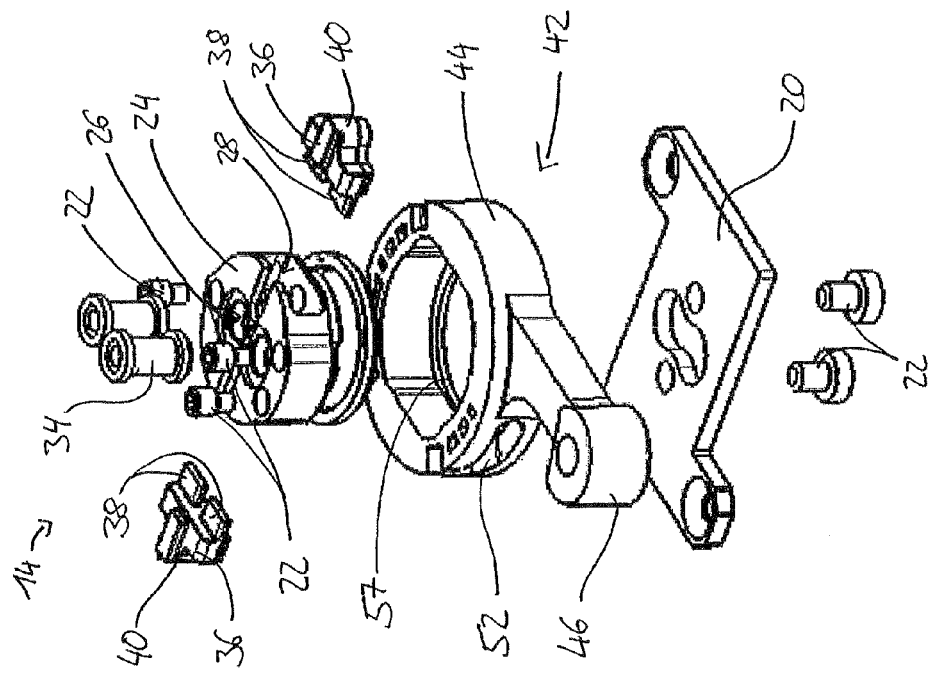

The invention relates to a connecting device for a channel module for connecting a fluid sensor to the channel module, and to a channel module having a connecting device.

BACKGROUND OF THE INVENTION

Channel module systems for conducting and analyzing a fluid are typically based on a modular principle, that is to say, individual channel modules and fluid sensors are interchangeable. The fluid sensors are used for determining individual parameters of the fluid to be analyzed and are mounted on the channel modules. The fluid to be analyzed is routed toward and away from the fluid sensors via supply openings in the channel module.

Tools are normally required to detach and mount a fluid sensor on a channel module. In addition, the fluid stream in the channel system has to be interrupted so that fluid cannot escape in an uncontrolled manner from the supply openings of the channel module when the fluid sensor is being replaced. Therefore it is not possible to exchange a fluid sensor while the channel system is in operation.

The problem addressed by the invention is to provide a connecting device that enables easy mounting of the fluid sensor on a channel module without interrupting the entire fluid system.

BRIEF DESCRIPTION OF THE INVENTION

This problem is solved by a connecting device for a channel module for connecting a fluid sensor to the channel module, with a locking device that can secure the fluid sensor on the channel module, a closure device that allows the flow of a fluid conducted in the channel module from the channel module to the fluid sensor, and an actuating means, whereby the actuating means actuates the locking device. Due to the provision of an actuating means, a fluid sensor can be attached to and detached from a channel module without the aid of a tool. The closing device also allows the interruption of the fluid flow from the channel module to the fluid sensor, so that the fluid flow in the channel system does not have to be interrupted to replace the fluid sensor.

The actuating element preferably actuates the closure device, thus reliably preventing the uncontrolled escape of fluid while the fluid sensor is being replaced.

In one embodiment, the actuating means is adjustable along an actuating path and has two activation sections, wherein the first activation section actuates the locking device and the second activation section actuates the closure device. In this manner a temporally separated actuation of the locking device and the closure device is possible.

The two activation sections preferably have an actuating region and an idle region, wherein the actuating region of the first activation section corresponds to the idle region of the second activation section and vice versa, so that when moved along the actuating path, the actuating means actuates the closure device and the locking device substantially one after the other. This arrangement ensures that the fluid sensor can be detached from the channel module only after the closure device has been actuated, or that, during installation, the fluid flow to the fluid sensor is only opened after the fluid sensor has been securely mounted.

In one embodiment, the locking device has an open and a closed position, wherein a fluid sensor can be placed on or removed from the channel module in the open position, and in the closed position a positioned fluid sensor is securely connected to the channel module, so that the locking device allows the fluid sensor to be locked securely onto the channel module without the use of tools.

The closure device preferably has an open and a closed position, wherein a fluidic connection between the channel module and the fluid sensor exists in the open position, and the fluid flow between the channel module and the fluid sensor is interrupted in the closed position, allowing an exchange of the fluid sensor without blocking the entire channel system.

For example, the actuating means is designed in such a way that the closure device can only assume its open position if the locking device is in the closed position. An uncontrolled escape of fluid while replacing the fluid sensor is thus reliably avoided.

In one configuration of the invention, the closure device has at least one slide and an elastic sealing element with at least one channel, wherein the fluid flows through the channel of the sealing element, and the slide is arranged at the side of the sealing element, and mounted so as to be movable towards the sealing element, thus realizing a closure device in a simple and cost-effective manner.

In the closed position of the closure device, the slide preferably presses into the sealing element to such an extent that the channel is tightly closed. Thus the fluid flow to the fluid sensor can be interrupted in a simple manner.

The sealing element can have two fluid channels and a bypass channel, the bypass channel being able to provide a fluidic connection between the two fluid channels so that fluid flow through the channel module, on which the connecting device is mounted, is allowed even in the closed position of the closure device.

In another embodiment, the actuating means has an annular functional element, whereby a compact design of the actuating means is achieved.

The functional element preferably has at least one groove, which forms the first activation section and opens at the side of the functional element facing the fluid sensor, the groove being designed to receive a locking protrusion of the fluid sensor and the wall of the groove facing the fluid sensor forming the locking device, thus creating a compact and cost-effective locking device.

For example, the groove extends starting from the opening initially at least partially axially into the interior of the functional element and then, forming an edge, runs predominantly along the periphery of the functional element, a region of the groove that includes the opening and the edge forming the actuating region of the groove so that the first activation section, in the form of the groove, is also constructed in a space-saving manner.

A locking region, which is formed from the other part of the groove, can adjoin the actuating region of the groove, whereby the locking region is also formed without additional parts.

In one embodiment, the groove is formed as a bayonet mount. In this way the locking device is simple to operate.

According to another embodiment, the functional element surrounds the closure device and the interior side of the functional element is designed as a guide track which forms the second activation section, the slides being in contact with the guide path allowing an easy actuation of the slide.

For example, the idle region of the guide track is formed by a circumferential region of the guide track in which the radius of the guide track remains constant, so that the idle region is also formed compactly on the functional element.

The actuating region of the guide track preferably has a region in which the radius of the guide track varies over a region of the periphery of the functional element so that the slides are operated by simple rotation of the functional element.

In another embodiment, the opening of the groove and the point of the interior side of the functional element with the largest radius are arranged circumferentially offset to one another so that the locking device and the closure device are actuated in succession when the functional element is rotated.

The locking region of the groove preferably extends along the circumference of the functional element to such an extent that the end of the locking region and the point of the guide track with the largest radius lie on a straight line extending radially from the center of the outer periphery of the functional element, so that the end of the second region is simultaneously the end of the actuating path of the actuating means and the closure element assumes its open position in this position.

In another configuration of the invention, the actuating means has a lever with which the actuating means can be actuated manually without the aid of tools.

The invention further relates to a channel module with a connecting device, the channel module having at least one mounting opening, designed in such a way that it can receive a mounting protrusion of a fluid sensor, by means of which the sensor module can be correctly positioned on the channel module.

The invention further relates to a fluid sensor for mounting on a channel module, the fluid sensor having a blocking edge which presses into the sealing element in the mounted state of the fluid sensor on the channel module and thus closes the bypass channel. This ensures that the fluid flowing into the sealing element flows completely through the fluid sensor.

DRAWINGS

Figure 1:
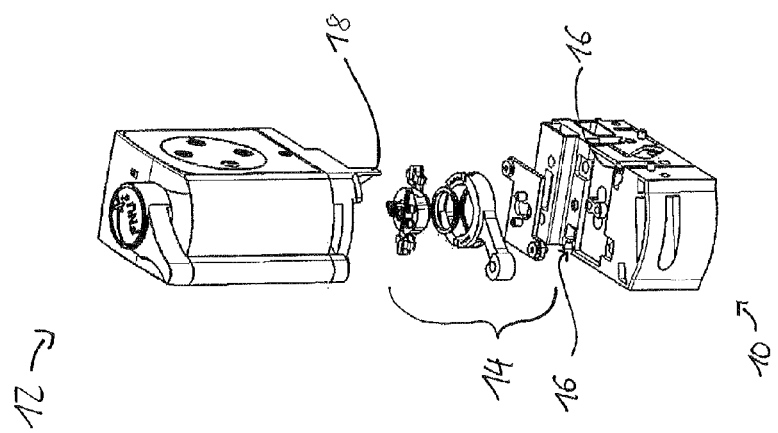
Figure 3:
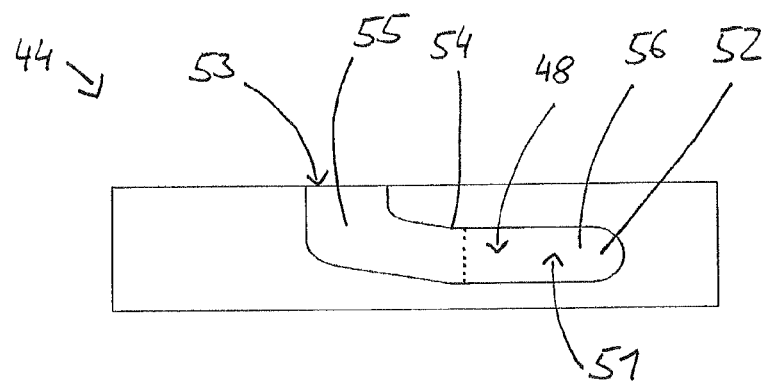
Figure 4:
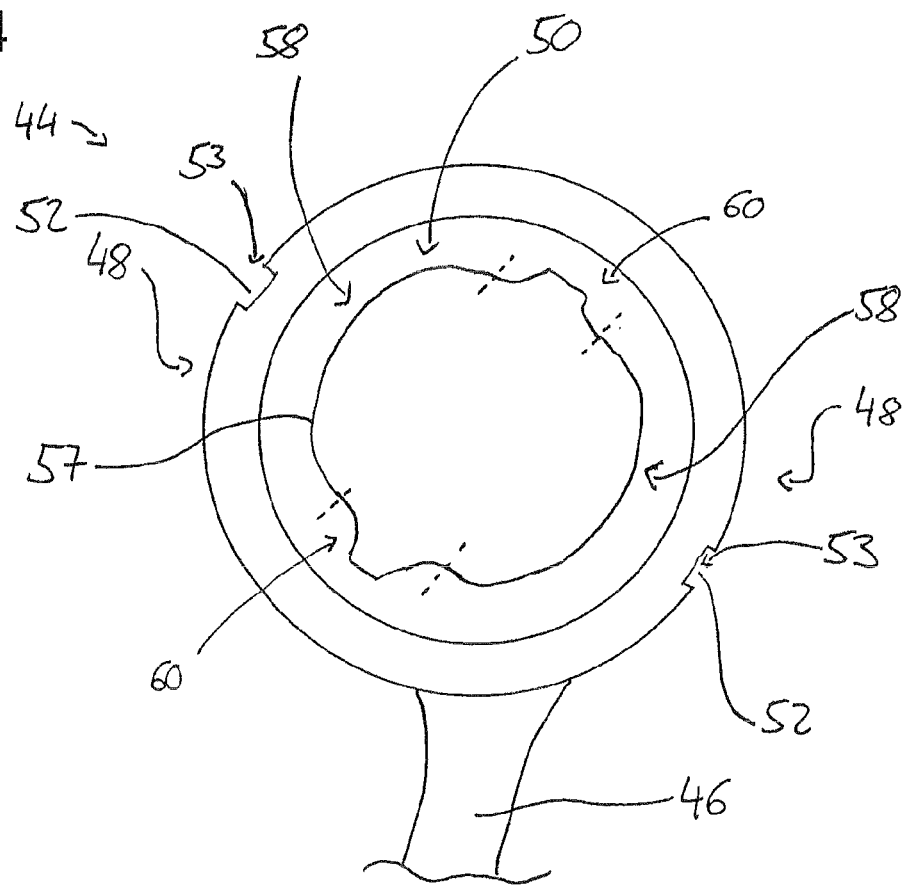
Figure 5:
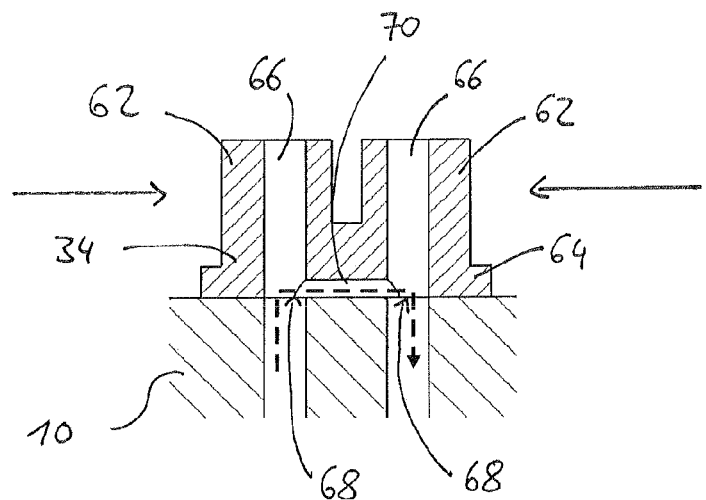
Figure 6:
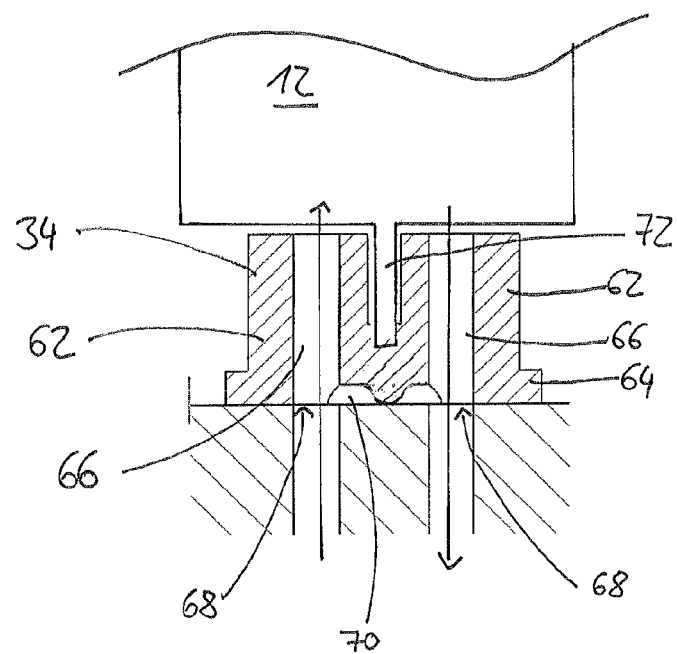
Figure 7:
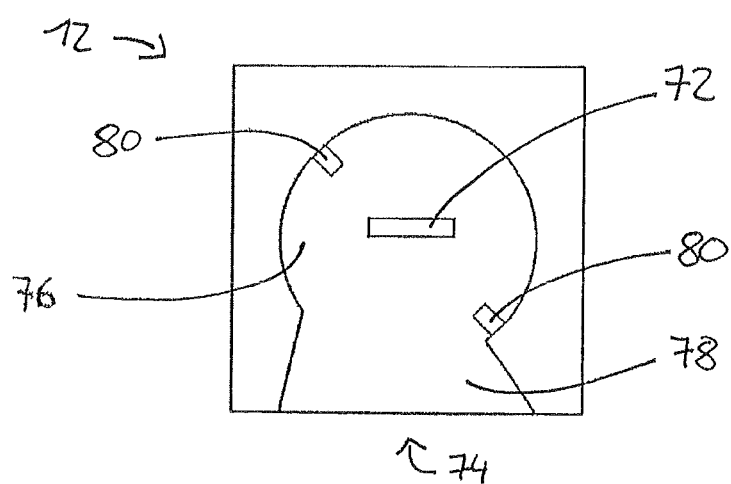
Figure 8:
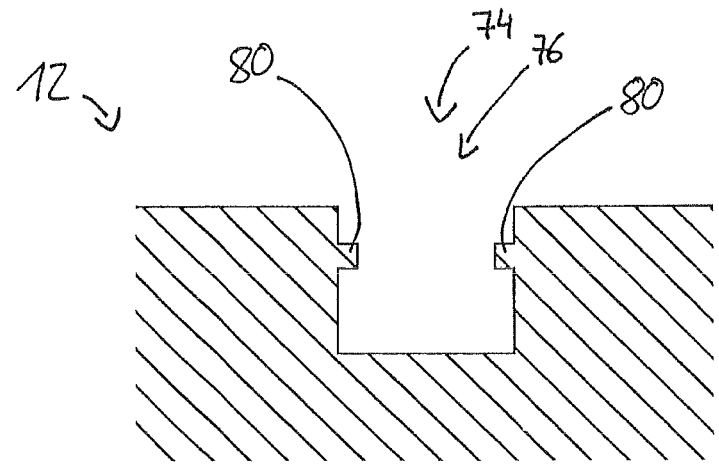

Further features and advantages of the invention follow from the description below and from the appended drawings, which will be referred to. In the drawings:

FIG. 1 shows an exploded view of an assembly consisting of a channel module according to the invention, a connecting device according to the invention and a fluid sensor according to the invention, FIG. 2 shows a detailed exploded view of a connecting device according to the invention, FIG. 3 shows a side view of a functional element according to FIG. 2, FIG. 4 shows a plan view of the functional element according to FIG. 2, FIG. 5 shows a cross-section through the sealing element of the connecting device according to FIG. 2, FIG. 6 shows a cross-section of the sealing element according to FIG. 5 with a closed bypass channel, FIG. 7 shows a bottom view of the fluid sensor according to FIG. 1, and FIG. 8 partially shows a sectional view of the fluid sensor according to FIG. 1.

DETAILED DESCRIPTION OF THE INVENTION

FIG. 1 shows a channel module 10 on which a fluid sensor 12 can be mounted with the assistance of a connecting device 14. In addition to the connecting device 14, mounting openings 16 are provided in the side of the channel module 10 facing the fluid sensor 12, as well as mounting protrusions 18 that are aligned with the mounting openings 16 and are arranged on the side of the fluid sensor 12 facing the channel module 10.

A detailed exploded view of the connecting device 14 is shown FIG. 2. The connecting device 14 has a base plate 20 that can be mounted on the channel module 10 with fasteners 22, particularly screws.

A base body 24 is fixed to the base plate 20, for example by means of additional fasteners 22, particularly screws. The base body 24 serves as a support for the connecting device 14 and has a substantially circular cross-section. A channel recess 26 and a clamping body recess 28 are formed in the base body 24.

The channel recess 26 extends axially in the center region of the base body 24 over the entire length of the base body 24 and is used to receive a sealing element 34, which will be described in detail below.

The clamping body recess 28 extends radially across the entire diameter of the base body 24, and is divided into two parts by the channel recess 26. A slide 36 is movably arranged in each of the parts of the clamping body recess 28, whereby the slides 36 have clamping sections 38 and thrust sections 40. The clamping sections 38 are located on the side of the slides 36 facing the sealing element 34. The thrust sections 40 are arranged on the side facing away from the sealing element 34 and protrude radially out of the clamping body recess 28.

The sealing element 34 and the slides 36 together form a closure device 34, 36.

The base body 24 is surrounded by an actuating means 42 having a functional element 44 and a lever 46, which are integrally formed in this embodiment. The functional element 44 is annular and surrounds the entire circumference of the base body 24.

As can be seen in FIGS. 3 and 4, the functional element 44 has a first activation section 48 on its outer circumference and a second activation section 50 on its inner circumference, whereby the first activation section 48 actuates a locking device 51 and the second activation section 50 activates the closure device 34, 36 (FIG. 2).

The first activation section 48 is formed from two diametrically opposed grooves 52 on the outer circumference of the functional element 44. The grooves 52 open on to the side facing the fluid sensor 12 and extend from their openings 53, initially at least partially axially, into the interior of the functional element 44, for example initially completely axially and then at an angle to the sides of the functional element 44. They then run predominantly along the circumference of the functional element 44, forming edges 54.

A region of the grooves 52, that includes the openings 53 and the edges 54, forms an actuating region 55 of the grooves 52. A second region of the grooves 52 adjoins the actuating region 55 and extends predominantly along the circumference of the functional element 44 and forms a locking region 56 of the grooves 52. The grooves 52, more precisely the walls of the grooves 52 and the edges 54 facing the fluid sensor 12, form the locking device 51. The locking region 56 can also be viewed as an idle region of the first activation section 48.

The radially interior side of the functional element 44 is designed as a guide track 57, which serves as a second activation section 50. The thrust sections 40 of the slides 36 are in contact with the guide track 57 (cf. FIG. 2), whereby the guide track 57 does not have a circular cross-section but does instead have areas with different radii. The contour of the guide track 57 is point-symmetric relative to the center of the cross-sectional area of the base body 24.

The regions of the guide track 57 in which the radius remains constant, partially form idle regions 58 of the guide track 57 and thus of the second activation section 50. Regions of the guide track 57 in which the radius changes, form an actuating region 60 of the guide track 57 and thus of the second activation section 50. The actuation regions 60 also comprise adjoining sections with a uniformly large radius.

The openings 53 of the grooves 52 and the point of the guide track 57 with the largest radius are arranged offset to one another along the circumference of the functional element 44. On the other hand, the idle regions or the locking regions 56 of the first activation sections 48, i.e. the grooves 52, terminate in circumferential direction next to the points of the guide track 57 with the largest radius.

FIGS. 5 and 6 illustrate the sealing element 34 and a part of the channel module 10 in cross-section. The sealing element 34 consists of elastic material and has two cylindrical sections 62 and a base section 64 that is in contact with the surface of the channel module 10. A channel 66 runs through each of the cylindrical sections 62. They are each aligned with one of the supply openings 68 formed in the surface of the channel module 10. The two channels 66 extend through the entire length of the sealing element 34, consequently in each case completely through a cylindrical section 62 and the base section 64. In the base section 64 there is also a bypass channel 70, which is either arranged completely inside the base section 64 or, as in the current embodiment, is formed as a groove in the base section 64, forming a channel with the surface of the channel module 10. The bypass channel 70 connects the two channels 66 to one another and thus also connects the two supply openings 68 of the channel module 10.

FIG. 6 shows a portion of FIG. 5, in which however the fluid sensor 12 (indicated schematically in FIG. 6) is positioned on the channel module 10. A blocking edge 72, which is arranged on the side of the fluid sensor 12 facing the channel module 10 (also see FIG. 7), is situated between the two cylindrical sections 62 of the sealing element 34. The blocking edge 72 presses so far into the base section 64 that the bypass channel 70 is completely closed.

FIG. 7 shows a view of the side of the fluid sensor 12 facing the channel module 10. A recess 74, which has a circular section 76 and a lever section 78, is formed on the fluid sensor 12. The blocking edge 72 is arranged within the circular section 76. Two diametrically opposed locking protrusions 80 are provided on the sidewalls of the circular section 76 and are formed to be able to engage in the grooves 52 of the functional element 44.

The locking protrusions 80 are also visible in FIG. 8, with the locking protrusions 80 being a distance away from the side of the fluid sensor 12 that faces the channel module 10, the upper side in FIG. 8, so that they can engage behind the edges 54 and the walls of the grooves 52 facing the fluid sensor.

To describe the mode of operation of the connecting device 14, a replacement process of a fluid sensor 12 which is arranged on the channel module 10 and through which fluid flows, will be explained.

In the secured position, the mounting protrusions 18 of the fluid sensor 12 engage for positioning in the mounting openings 16 of the channel module 10. At the same time, the locking protrusions 80 of the fluid sensor are located in the grooves 52 of the functional element 44, more precisely at the end of the locking region 56 facing away from the actuating region 55.

In addition, the blocking edge 72 presses on the base section 64 of the sealing element 34, thus closing the bypass channel 70. Thereby the fluid to be analyzed can flow out of the channel module 10 through one of the supply openings 68 and one channel 66 into the fluid module and can flow back out of the fluid sensor through the other channel 66 and the other supply opening 68. This is indicated in FIG. 4 by the arrows with solid lines.

Because the locking protrusions 80 of the fluid sensor 12 are in the locking region 56 of the grooves 52, the fluid sensor 12 is secured against undesired removal. The locking device 51 is consequently in its closed position, and the closure device 34, 36 is in its open position.

If replacement of the fluid sensor 12 is desired, then the actuating means 42 is actuated by means of the lever 46. Thereby the functional element 44 is turned counterclockwise with reference to FIG. 2. In the process, the locking protrusions 80 pass through the locking region 56 of the grooves 52, or the first activation section 48. At the same time, the thrust sections 40 of the slides 36 pass through the actuating region 60 of the guide track 57, or the second activation section 50. More precisely, the slides 36 are moved in the direction of the sealing element 34 due to a reduction of the radius of the guide track 57.

As soon as the thrust sections 40 of the slides 36 are in the region of the guide track 57 with the smallest radius, the clamping sections 38 of the slides 36 press against the cylindrical sections 62 of the sealing element 34 (indicated by the arrows in FIG. 5), whereby the channels 66 running in the cylindrical sections 62 are completely closed. Thereby the fluid flow from the channel module 10 to the fluid sensor 12 is interrupted. The closing device 34, 36 is now in its closed position as is the locking device 51.

If the functional element 44 is turned further by the lever 46, the locking protrusions 80 reach the actuation region 55 of the grooves 52, or the first activation sections 48. The locking device 51 is now in its open position.

At the same time, the thrust sections 40 of the slides 36 pass through the idle region 58 of the guide track 57, in which there is no change of radius. Thus the closure device 34, 36 remains in its closed position. The fluid sensor 12 can now be removed from the channel module 10. In the process, the locking protrusions 80 leave the grooves 52, and the blocking edge 72 is removed from the base section 64 of the sealing element 34, so that the bypass channel 70 is unblocked. This allows a fluid flow through the channel module 10 even without a mounted sensor element 12. This flow path is illustrated in FIG. 5 by the arrow with broken lines.

The mounting of a fluid sensor 12 on the channel module 10 is carried out in reverse order, so that the locking device 51 is first brought into its closed position before the closure device 34, 36 unblocks the channels 66.

It goes without saying that the embodiment illustrated here is not limiting. Rather additional embodiments are evident to a person skilled in the art; for example an elongated functional element with a linear actuating path. It is also possible for the closure device to be actuated by the use of the fluid module and not have to depend on an actuation by the actuating means. It is conceivable that the axial force with which the fluid module is placed on the channel module can be converted into a force transverse to the fluid module by a mechanism such as a rocker. This force could then be used to open the closure device and thus release the fluid flow to the fluid sensor.

The invention claimed is:

1. A connecting device for connecting a fluid sensor to a channel module, having a locking device that can secure the fluid sensor on the channel module, a closure device that can allow a flow of a fluid conducted in the channel module from the channel module to the fluid sensor, and an actuating device having two activation sections, wherein the two activation sections each have an actuating region and an idle region, the actuating region of the first activation section corresponding to the idle region of the second activation section and vice versa, so that when moved along an actuating path, the actuating device actuates the closure device and the locking device substantially one after the other, the actuating device actuating the closure device and the locking device, wherein the flow of fluid to the fluid sensors can only occur after the fluid sensor is securely mounted on the channel module, and wherein the closure device has at least one slide and an elastic sealing element with at least one channel, whereby the fluid flows through the channel of the sealing element and the slide is arranged at a side of the sealing element, and is mounted so as to be movable in a transverse direction towards the sealing element to control the fluid flowing through the elastic sealing element.

2. The connecting device according to claim 1, wherein the locking device has an open and a closed position, whereby the fluid sensor can be positioned on or removed from the channel module in the open position, and the fluid sensor is securely connected to the channel module in the closed position.

3. The connecting device according to claim 2, wherein the actuating device is designed in such a way that the closure device can only assume its open position if the locking device is in the closed position.

4. The connecting device according to claim 1, wherein the actuating device has an annular functional element.

5. The connecting device according to claim 4, wherein the two activation sections each have an actuating region and an idle region, the actuating region of the first activation section corresponding to the idle region of the second activation section and vice versa, so that when moved along their respective actuating paths, the actuating device actuates the closure device and the locking device substantially one after the other, and the functional element has at least one groove which forms the first activation section and opens at the side of the functional element facing the fluid sensor, the groove being designed to receive a locking protrusion of the fluid sensor, and a wall of the groove facing the fluid sensor forms the locking device.

6. The connecting device according to claim 5, wherein the groove extends, starting from an opening, initially at least partially axially into an interior of the functional element and then, forming an edge, runs predominantly along a periphery of the functional element, a region of the groove that includes the opening and the edge forming the actuating region of the groove.

7. The connecting device according to claim 6, wherein a locking region adjoins the actuating region of the groove, the locking region being formed from the other part of the groove.

8. The connecting device according to claim 7, wherein the groove is designed as a bayonet mount.

9. The connecting device according to claim 5, wherein the functional element surrounds the closure device and an interior side of the functional element is designed as a guide track which forms the second activation section, the slides resting against the guide track.

10. The connecting device according to claim 9, wherein the idle region of the guide track is formed by a circumferential region of the guide track in which the radius of the guide track remains constant.

11. The connecting device according to claim 9, wherein the actuating region of the guide track has a region in which the radius of the guide track varies over a region of a periphery of the functional element.

12. The connecting device according to claim 9, wherein an opening of the groove and a point of the guide track with the largest radius are arranged circumferentially offset to one another.

13. The connecting device according to claim 9, wherein a locking region adjoins the actuating region of the groove, the locking region being formed from the other part of the groove, and the locking region of the groove extends along a circumference of the functional element so far that the end of the locking region and a point of the guide track with the largest radius lie on a straight line extending radially from the center of an outer periphery of the functional element.

14. A channel module with a connecting device according to claim 1.

15. The channel module according to claim 14, wherein the channel module has at least one mounting opening which is constructed in such a way that it can receive a mounting protrusion of a fluid sensor.

16. The connecting device according to claim 1, wherein the actuating device is adjustable along an actuation path, and wherein the first activation section actuates the locking device and the second activation section actuates the closure device.

17. The connecting device according to claim 1, wherein the closure device has an open and a closed position, whereby a fluidic connection between the channel module and the fluid sensor exists in the open position, and the flow of fluid between the channel module and the fluid sensor is interrupted in the closed position.

18. The connecting device according to claim 1, wherein, in the closed position of the closure device the slide presses into the sealing dement to such an extent that the channel is tightly closed.

19. The connecting device according to claim 1, wherein the sealing element has two channels and a bypass channel, the bypass channel providing a fluidic connection between the two channels.

20. The connecting device according to claim 1, wherein the actuating device has a lever.

21. The fluid sensor with a connecting device according to claim 1.

22. A fluid sensor for mounting on a channel module in a connecting device, wherein the connecting device has a locking device for securing the fluid sensor on the channel module, a closure device for allowing a flow of a fluid conducted in the channel module from the channel module to the fluid sensor, and an actuating device having two activation sections, wherein the two activation sections each have an actuating region and an idle region, the actuating region of the first activation section corresponding to the idle region of the second activation section and vice versa, so that when moved along an actuating path, the actuating device actuates the closure device and the locking device substantially one after the other, the actuating device actuating the closure device and the locking device, and wherein the flow of fluid to the fluid sensors can only occur after the fluid sensor is securely mounted on the channel module, and wherein the closure device has a sealing element having two channels and a bypass channel, the bypass channel providing a fluidic connection between the two channels, and the fluid sensor has a blocking edge which presses into the sealing element in a mounted state of the fluid sensor on the channel module and thus closes the bypass channel.

23. A fluid sensor for mounting on a channel module via a connective device, wherein the connective device has a locking device having a lever for securing the fluid sensor on the channel module, a closure device that allows a flow of a fluid conducted in the channel module from the channel module to the fluid sensor, an actuating device, the actuating device actuating the locking device, and a sealing element having two channels and a bypass channel, the bypass channel providing a fluidic connection between the two channels, and the fluid sensor has a blocking edge which presses into the sealing element in a mounted state of the fluid sensor on the channel module and thus closes the bypass channel.

\* \* \* \* \*

UNITED STATES PATENT AND TRADEMARK OFFICE
CERTIFICATE OF CORRECTION

PATENT NO. : 9,476,530 B2
APPLICATION NO. : 14/258939
DATED : October 25, 2016
INVENTOR(S) : Dierks et al.

Page 1 of 1

It is certified that error appears in the above-identified patent and that said Letters Patent is hereby corrected as shown below:

Claim 18, Column 8, Line 40, "dement" should be --element--.

Signed and Sealed this
Thirty-first Day of July, 2018

Andrei Iancu
*Director of the United States Patent and Trademark Office*